(12) United States Patent
Rumreich et al.

(10) Patent No.: US 6,549,593 B1
(45) Date of Patent: Apr. 15, 2003

(54) INTERFACE APPARATUS FOR INTERFACING DATA TO A PLURALITY OF DIFFERENT CLOCK DOMAINS

(75) Inventors: Mark Francis Rumreich, Indianapolis, IN (US); David Lawrence Albean, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/356,820

(22) Filed: Jul. 19, 1999

(51) Int. Cl.$^7$ .................................................. H04L 7/00
(52) U.S. Cl. .................. 375/354; 375/355; 375/356; 375/357; 375/364; 375/370; 375/375
(58) Field of Search ................................. 375/354, 355, 375/356, 357, 362, 364, 370, 371, 375

(56) References Cited

U.S. PATENT DOCUMENTS

| | | | |
|---|---|---|---|
| 4,523,274 A | 6/1985 | Fukunaga et al. ........... 364/200 |
| 4,970,676 A | * 11/1990 | Fling ........................... 364/759 |
| 5,045,801 A | 9/1991 | Mowery ....................... 328/72 |
| 5,256,912 A | * 10/1993 | Rios ............................. 307/269 |
| 5,369,672 A | 11/1994 | Matsumoto .................. 375/106 |
| 5,392,422 A | 2/1995 | Hoel et al. ................... 395/550 |
| 5,422,914 A | 6/1995 | Snyder ......................... 375/354 |
| 5,510,732 A | 4/1996 | Sandhu ......................... 326/94 |
| 5,537,557 A | 7/1996 | Briffett et al. ............... 395/309 |
| 5,548,620 A | 8/1996 | Rogers ......................... 375/354 |
| 5,598,113 A | 1/1997 | Jex et al. ....................... 326/94 |
| 5,793,227 A | 8/1998 | Goldrian ....................... 326/94 |

* cited by examiner

*Primary Examiner*—Chi Pham
*Assistant Examiner*—Pankaj Kumar
(74) *Attorney, Agent, or Firm*—Joseph S. Tripoli; Joseph J. Laks; Ronald H. Kurdyla

(57) ABSTRACT

Interface apparatus for interfacing data to a plurality of different clock domains where the clock signals in the different domains are phase locked together and respective clock signals have different frequencies includes a plurality of cascade connected first and second latches coupled between respective clock domains. One of the latches is a clocked Data Latch and the other is a clocked and Enabled Data Latch. A timing generator provides respective domain clock signals, wherein a domain clock signal of a domain providing a data signal is applied to the clock input connection of the first latch of a respective cascade connected set of latches and a domain clock signal of a domain receiving said data signal is applied to the second latch. The timing generator also provides a common Enable Signal phase locked to the domain clocked signals. The common Enable Signal is applied to the enable input terminal of one of the latches of each set of cascade connected latches.

8 Claims, 4 Drawing Sheets

INTERFACE APPARATUS FOR INTERFACING DATA TO A PLURALITY OF DIFFERENT CLOCK DOMAINS

This invention relates to transferring data between systems having a plurality of clocks with a plurality of different frequencies.

BACKGROUND OF THE INVENTION

Frequently, digital systems will require sub-apparatus which operate at different clock frequencies, and which receive control information from a common data bus. If the respective sub-apparatus captures the distributed control information using its respective clock, rather than a common bus clock, there is potential for error. That is, transferring digital data from one clock domain to another clock domain is subject to metastability.

Typically, known systems utilize buffer memory and/or condition the phase of the clock in one or both of the clock domains to avoid the metastability. An example of this approach is described in U.S. Pat. No. 5,548,620. In this exemplary system, at respective clock domain interfaces, data is clocked through a master and a slave flip-flop at the output of the first domain and a master and a slave flip-flop at the input of the second domain. The master flip-flop of the first domain is clocked by the first domain clock. The slave flip-flop in the second domain is clocked by the second domain clock. The slave flip-flop in the first domain and the master flip-flop in the second domain are both clocked by respectively different clocks that are generated in phase locked loop circuitry.

Using this approach to the interfacing of data between clock domains can become complicated and expensive if multiple clock domains are involved. Thus there is a need for a simple approach to data interfacing to avoid metastability in digital apparatus having multiple clock domains.

SUMMARY OF THE INVENTION

The present invention is directed to clock domain interface circuitry for providing data interfacing between clock domains. This circuitry includes a first latch at the output of a first clock domain, and a second latch at the input to the second clock domain. The first and second latches are clocked by their respective domain clocks. An Enable Signal, which is a logical function of the respective clocks is applied to enable one of the first and second latches.

DETAILED DESCRIPTION

Figure 1:
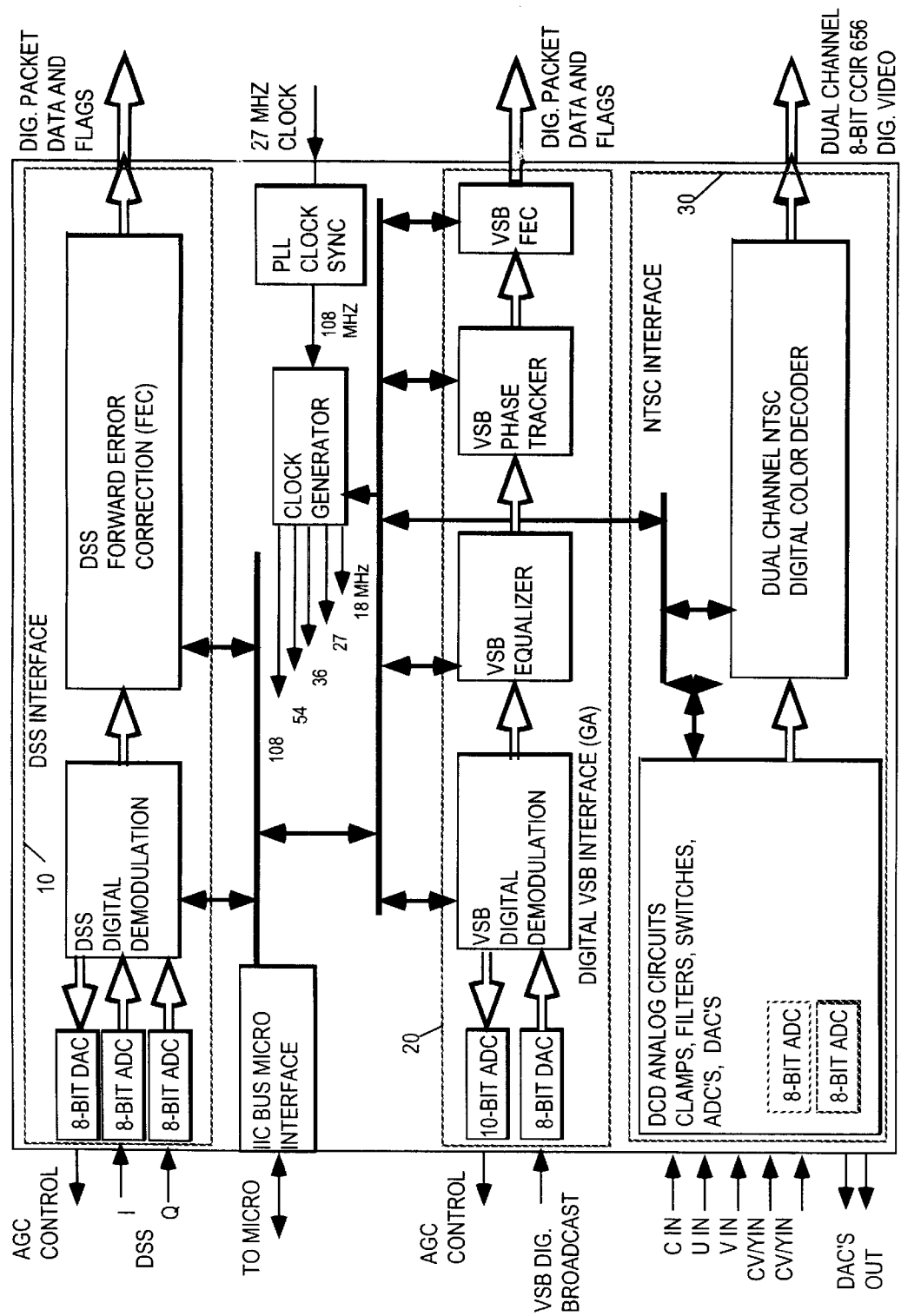
FIG. 1 is a block diagram of an exemplary digital processing system having a plurality of clock domains.

FIG. 1 is an interface integrated circuit which is useful in defining an environment of the invention, but is not restrictive. The invention may be practiced in any integrated circuit (IC) or other closely packed circuitry such as a multichip IC package or hybrid IC package incorporating multiple clock domains. Other examples may include multiprocessor IC's for multimedia processing, multichannel digital audio processing/editing IC's and systems, just to name a few.

FIG. 1 illustrates an interface or link IC for a multiplatform television system. This IC is configured to simultaneously digitally process a plurality of television signals received in different formats. The respective processors are circumscribed with dashed lines. The circuitry circumscribed with dashed line 10 is configured to process digital direct broadcast satellite signal. This circuitry includes two analog to digital converters for processing quadrature signals from a satellite tuner, a digital demodulator and error correction circuitry. The respective elements within this circuitry may require different clocking signals such as for example, 18 MHz, 54 MHz and 27 MHz clock signals and thus may include a plurality of clock domains. Various control signals from the microprocessor interface may be coupled to ones of these domains.

A second processing block circumscribed by the dashed line 20 receives and processes high definition digital signals such as may be transmitted according to the Grand Alliance protocol. This circuitry includes at least one analog to digital converter, a digital demodulator, an equalizer/phase tracker and error correction circuitry. These elements may require different clocking signals such as, for example, 108 MHz, 54 MHz and 18 MHz clock signals, and thus includes another plurality of clock domains.

Thirdly, the IC includes an NTSC signal processor circumscribed by the dashed line 30. This circuitry includes analog to digital converters, filter circuitry, and digital color decoders. These elements may require different clocking signals such as, for example, 18 MHz, 36 MHz and 27 MHz clock signals, representing another plurality of clock domains.

Each of the respective larger blocks of circuitry includes a plurality of clock domains. However it is unlikely that control data will be provided to circuitry in each of the clock domains. It is likely that control data from the microprocessor will be required from more than one domain and that control data will be transferred between different domains.

Figure 2:
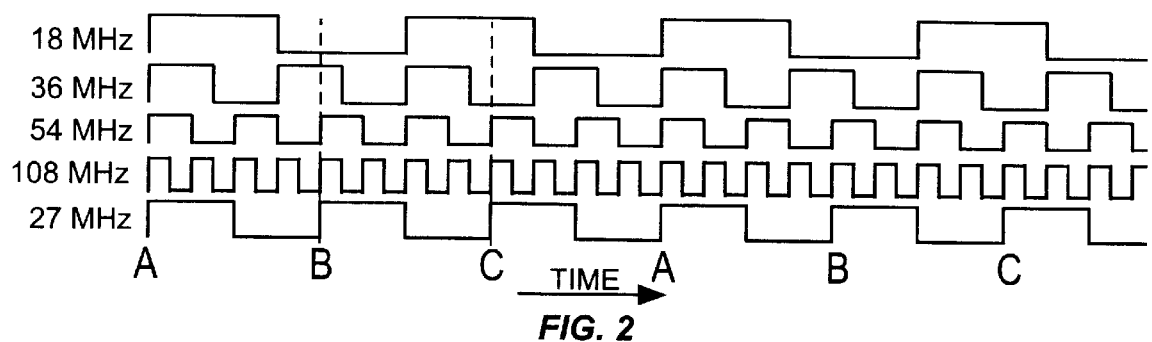
FIG. 2 is a waveform diagram of a plurality of exemplary clock signals which may be required in a particular digital processing system such as the system of FIG. 1.

Nominally the respective clocking signals will be provided by common clock generation circuitry including a phase locked loop to develop a master clock signal and a generator responsive to the master clock signal for providing a plurality of clock signals at different frequencies. In the exemplary IC the master clock is at 108 MHz, and the further clock signals are at 18, 27, 36 and 54 MHz. FIG. 2 illustrates exemplary timing relationships of these clock signals. These particular clock signals are phase locked to each other and are all simple multiples of 9 MHz. It will be appreciated that a plurality of clock signals widely divergent from those illustrated may be employed in similar or different IC's, and to which the invention will apply.

Two assumptions are made. The first is that data transferred between the clock domains does not change at the clock rate, i.e., the data rate is slower than the slower clock rate at a given clock domain interface. Secondly, the clock signals in the various domains are mutually phase locked. Assume at any domain interface that output data changes with the rising edge of the output clock transition, and that data is captured at the rising edge of an input clock transition. In this instance timing margins may be determined by examination of the exemplary waveforms of FIG. 2. In FIG. 2, all of the clock signals have rising transitions at the points designated A. Thus there is a zero timing margin between all domains and a high likelihood that a data error may occur if data is transferred at these instances. Consider the timing margin at point B between the 18 and 27 MHz clock domains. At point B the 27 MHz domain exhibits a rising transition which occurs 2 cycles of the 108 MHz clock (or 18.5 ns.) before rising transition of the 18 MHz clock. This represents a timing margin of the 18.5 ns. The timing margins for data transfer between other respective clock domains may be similarly determined. A listing of a representative sampling of the timing margins is given in TABLE 1.

TABLE I

| INPUT CLOCK MHz | OUTPUT CLOCK MHz | MARGIN AT A ns | MARGIN AT B ns | MARGIN AT C ns |
|---|---|---|---|---|
| 27 | 18 | 0 | 18.5 | 37.0 |
| 27 | 36 | 0 | 18.5 | 9.3 |
| 18 | 27 | 0 | 37.0 | 18.5 |
| 36 | 27 | 0 | 9.3 | 18.5 |

Table 1 indicates that the transitions at times B and C provide adequate timing margins for all four permutations of domain transfer required in the exemplary system of FIG. 1. Transitions at B provide better margin for bus input registers (input clock =27 MHz) and transitions at C provide better margin for output registers (output clock =27 MHz). For system where a common Enable Signal is to be employed, it may be necessary to select a common transition for all data domain transfers, e.g. transition B.

Figure 8:
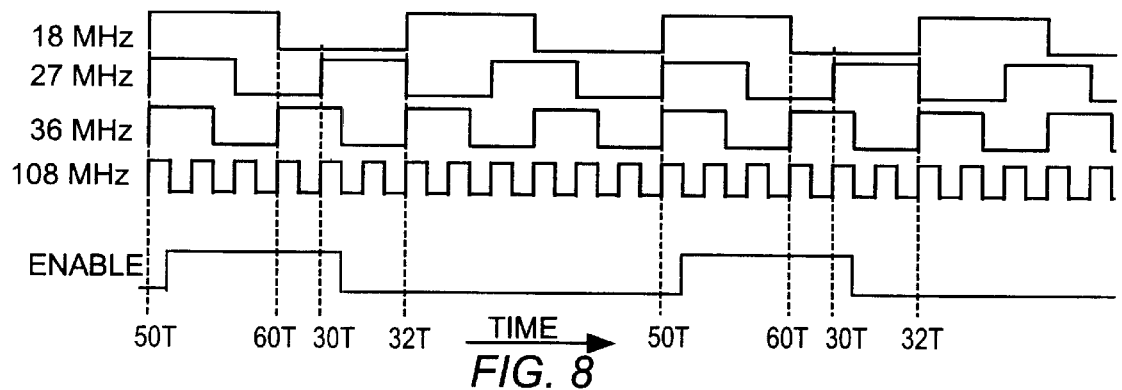
FIG. 8 is a waveform diagram of a typical Enable Signal with reference to the domain clocks.

FIG. 8 illustrates exemplary Enable Pulse timing where data transfer is to occur between 18 MHz, 27 MHz and 36 MHz clock domains. It will be recognized that, if the data is not synchronized to the Enable Pulses, each data word must be present for at least two cycles of the 18 MHz clock to insure data transfer. If a data word is lesser in duration it could occur between the Enable Signal pulses an be lost.

Figure 3:
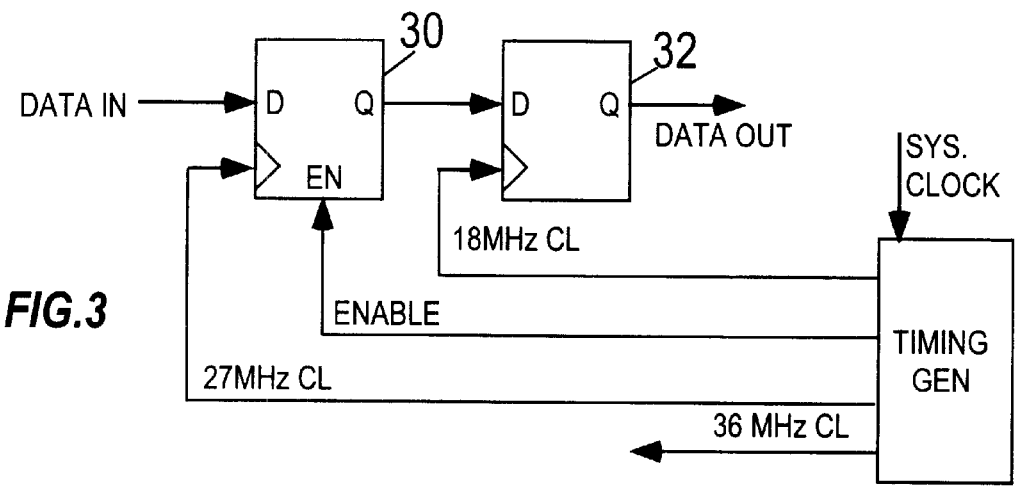
FIGS. 3–6 are block diagrams of data interface arrangements for interfacing between different clock domains.

Assume a system incorporating the FIG. 8 Enable Pulse. FIGS. 3–6 illustrate respective circuits for transferring data between respective clock domains. FIG. 3 illustrates circuitry for transferring data from a 27 MHz clock domain to a 18 MHz clock domain. The circuitry includes an Enabled Data Latch 30 and a simple Data Latch 32. Data is stored or latched into the respective latches coincident with positive going transitions of the respective clock signal.

Figure 7:
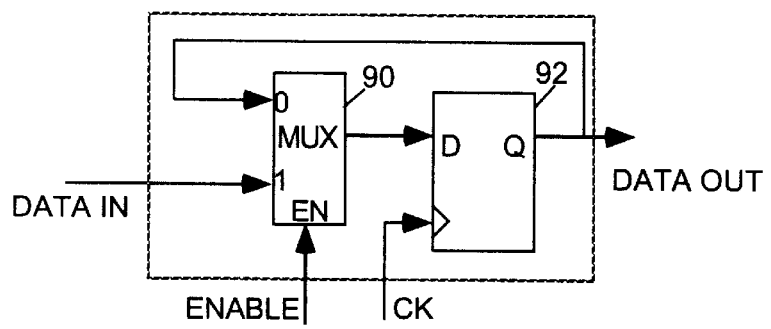
FIG. 7 is a schematic diagram of exemplary Enabled Data Latches of the type used in FIGS. 3–6.

Refer to FIG. 7 which illustrates exemplary circuitry for the Enabled Data Latch 30. This Enabled Data Latch comprises a simple Data Latch 92 and a multiplexor 90 The multiplexor is connected to feed back the output of the Data Latch 92 when the Enable Pulse is low and to input new data to the Data Latch 92 when the Enable Pulse is high. New data is loaded into the latch during positive transitions of the clock signal only when the Enable Signal is in a high logic state. The new data loaded into the Data Latch 92 is stored until the next coincidence of the Enable Pulse and a positive transition of the clock pulse.

Referring to FIG. 8, new data can be loaded into the Enabled Data Latch 30 at times designated 30T when the 27 MHz clock exhibits a positive transition and enable is high. This data will remain in Enabled Data Latch 30 until at least the next occurring time designated 30T. New data loaded in Enabled Data Latch 30, at the output of 27 MHz clock domain, will be loaded into Data Latch 32, at the input of the 18 MHz clock domain, during the next positive transition of the 18 MHz clock following time 30T. This transition is designated 32T in FIG. 8. It will be recognized that there is a full half cycle of the 27 MHz clock timing margin for transfer between clock domains.

Figure 4:
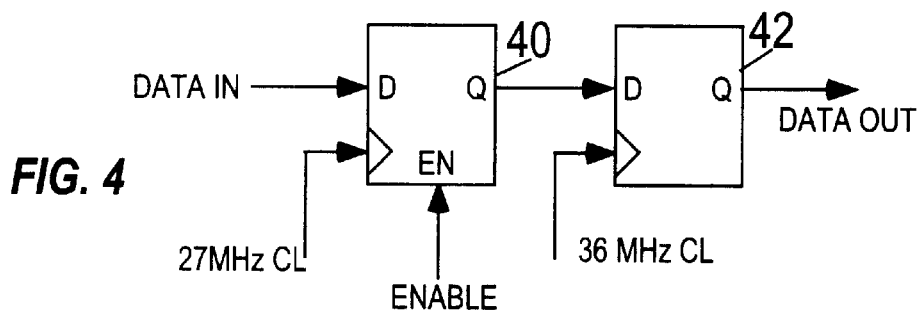

FIG. 4 illustrates circuitry for transferring data from a 27 MHz clock domain to a 36 MHz clock domain. The circuitry includes an Enabled Data Latch 40 and a simple Data Latch 42. Enabled Data Latch 40 is similar in design to Enabled Data Latch 30. Referring to FIG. 8, new data can be loaded into the Enabled Data Latch 40 at times designated 30T when the 27 MHz clock exhibits a positive transition and the Enable Signal is high. This data will remain in the Enabled Data Latch 40 until at least the next occurring time designated 30T. New data loaded in the Enabled Data Latch 40, at the output of 27 MHz clock domain, will be loaded into Data Latch 42, at the input of the 36 MHz clock domain, during the next positive transition of the 36 MHz clock following time 30T. This occurs at time 32T in FIG. 8. As with the FIG. 3 circuitry, there is a full half cycle of the 27 MHz clock timing margin for transfer between clock domains.

Figure 5:
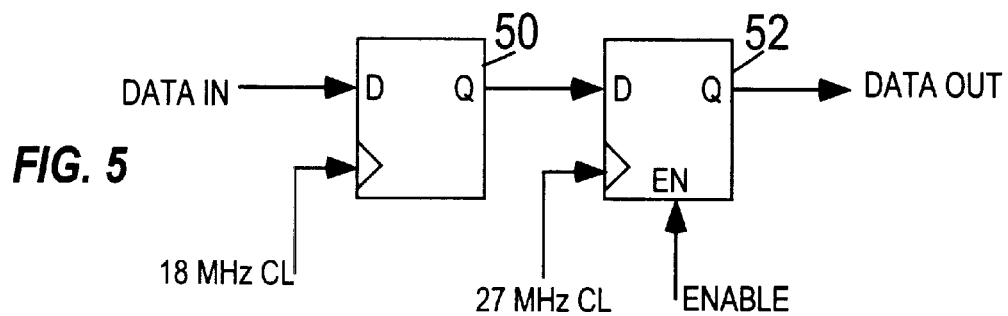

FIG. 5 illustrates circuitry for transferring data from a 18 MHz clock domain to a 27 MHz clock domain. The circuitry includes a Data Latch 50 and an Enabled Data latch 52. Enabled Data Latch 52 is similar in design to Enabled Data Latch 30. Referring to FIG. 8, new data can be loaded into the Data Latch 50 at all positive transition of the 18 MHz clock. This data will remain in Data Latch 50 until at least the next positive transition of the 18 MHz clock, but remember in this example, data word duration must be at least two cycles of the 18 MHz clock. Assume that new data is loaded in Data Latch 50, at the output of 18 MHz clock domain, at time 50T. This data will be loaded into Enabled Data Latch 52, at the input of the 27 MHz clock domain, during the next positive transition of the 27 MHz clock when the Enable Pulse is high. This occurs at time 30T in FIG. 8. The timing margin for this transfer between clock domains is almost a full cycle of the 27 MHz clock.

Figure 6:
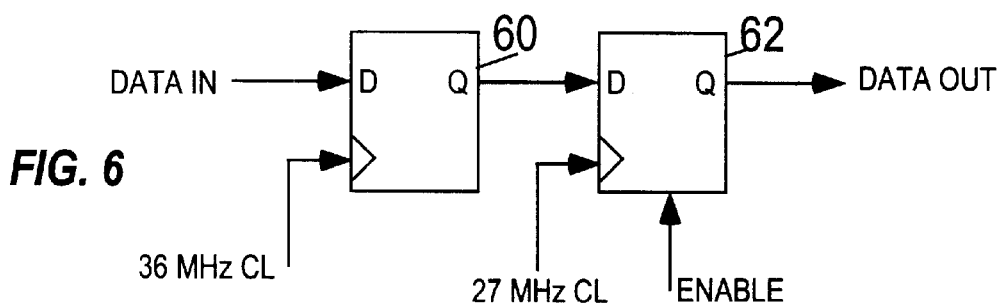

FIG. 6 illustrates circuitry for transferring data from a 36 MHz clock domain to a 27 MHz clock domain. The circuitry includes a Data Latch 60 and an Enabled Data latch 62. Enabled Data Latch 62 is similar in design to Enabled Data Latch 30. Referring to FIG. 8, new data can be loaded into the Data Latch 60 at all positive transition of the 36 MHz clock. This data will remain in Data Latch 60 until at least the next positive transition of the 36 MHz clock, but remember in this example, data word duration must be at least two cycles of the 18 MHz clock. Assume that new data is loaded in Data Latch 60, at the output of 36 MHz clock domain, at time 60T. This data will be loaded into Enabled Data Latch 62, at the input of the 27 MHz clock domain, during the next positive transition of the 27 MHz clock when the Enable Pulse is high. This occurs at time 30T in FIG. 8. The timing margin for this transfer between clock domains is one full cycle of the 108 MHz clock.

In FIGS. 3 and 4, data is retained in the input latches 30 and 40 for at least a cycle of the Enable Pulse by virtue of the feedback mechanism and the pulse sequence. The output latches 32 and 42 may be continuously clocked, but data therein will not change for the duration of an enable cycle because the input to these latches does not change during an enable cycle. In FIGS. 5 and 6, data in the respective input latches 50 an 60 may change with successive positive transitions of the respective clock signals. However, the data in the respective output latches 52 and 62 will remain constant for the duration of an enable cycle due to the feedback operation of the Enabled Data Latches.

Figure 9:
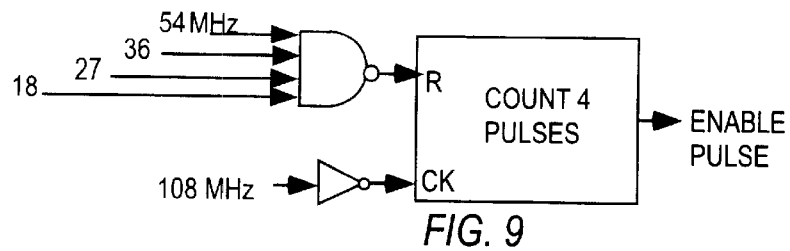
FIGS. 9, 10 and 12 are schematic diagrams of exemplary Enable Signal generating circuits.

FIG. 9 illustrates exemplary circuitry for generating the Enable Signal. In FIG. 9, the 18 MHz, 27 MHz, 36 MHz and 54 MHz clock signals are logically ANDED to generate a reset pulse occurring at time 50T. This reset pulse is F applied to a counter 70, arranged to count pulses of the complement of the 108 MHz clock signal. Counter 70 provides a pulse which is 4 cycles of the 108 MHz clock in duration, and which begins with the negative going transition of the 108 MHz clock following the reset pulse; that is, one half cycle of the 108 MHz clock following time 50T.

Figure 10:
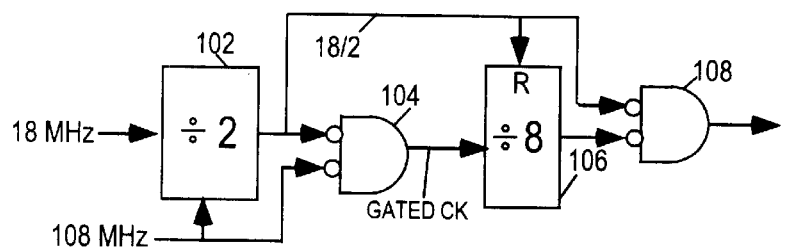
Figure 11:
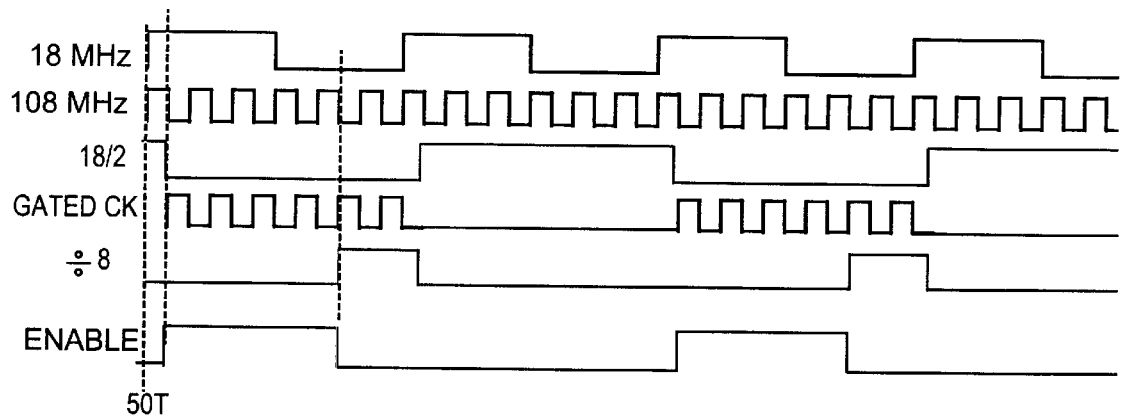
FIG. 11 is a signal waveform diagram useful for understanding the operation of the FIG. 10 circuitry.

FIG. 10 illustrates a second embodiment of an Enable Signal generator. FIG. 11 shows the relevant waveforms output by respective elements in FIG. 10. In this embodiment, the 18 MHz clock is divided by two in circuit 102 to generate a squarewave (designated 18/2 in FIG. 11) delayed one half cycle of the 108 MHz clock and having a cycle time equal to the duration of the enable cycle. The complement of this signal is logically ANDED (104) with the complement of the 108 MHz clock signal to provide a gated clock signal (GATED CK). The first pulse of the gated clock occurs one half cycle of the 108 MHz clock signal following time 50T. The gated clock is applied to a divide by 8 circuit 106. After four pulses of the gated clock, the output of the divide by 8 circuit goes high and continues high for the duration of the gated clock pulses. The 18/2 signal is applied to the reset input of the divide by 8 circuit 106, and causes the output of the divide by 8 circuit to be reset low coincident with the positive portion of the 18/2 signal. The complement of the 18/2 signal is logically ANDED with the complement of the signal from the divide by 8 circuit 106 in the AND circuit 108 to provide the Enable Signal.

Figure 12:
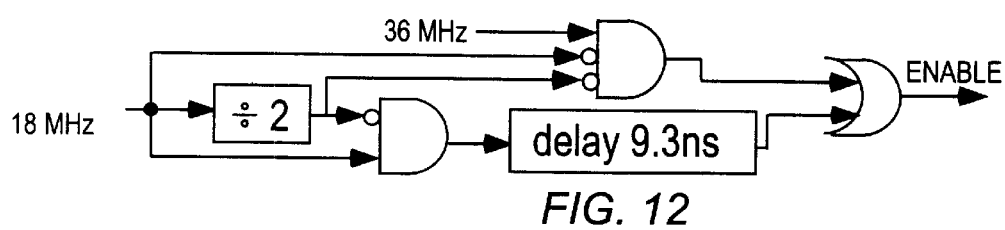

FIG. 12 shows a third alternative Enable Signal generating circuit. This circuit is derived from simple logic manipulation of the available clock signals which those skilled in the art of logic design will readily understand.

A generic graphical approach to generating the Enable Signal is to draw a timing diagram of the relevant clock signals with at least one complete cycle of the lowest common multiple of the clock periods included. The rising edges of each output domain clock is examined to determine if any rising edges of the input domain clocks are unacceptably close. The Enable Signal is drawn with a low logic level in all areas that the edges are unacceptably close and high otherwise. Thereafter it is generally possible to create an Enable Signal that is a superset (e.g. logical AND) of the various clock signals. Alternatively, once the timing of the Enable Signal is established, a state machine may be programmed to generate it. Note, "unacceptably close" edges are determined by worst case jitter/phase variation analysis between input and output clocks, taking the physical location of the relevant interface circuits into consideration.

What is claimed:

1. Interface apparatus for interfacing data to a plurality of different clock domains where the clock signals in the different domains are phase locked together and respective clock signals have different frequencies, and the data rate of data to be interfaced is slower than the clock rate of the slowest domain clock, said interface apparatus comprising:

a plurality of cascade connected first and second latches coupled between respective clock domains, one of said first and second latches being a clocked Data Latch and the other of said first and second latches being a clocked and Enabled Data Latch, respective clocked Data Latches having a data and a clock input connection and a data output connection, and respective clocked and Enabled Data Latches each having a clock and an enable input connection and a data output connection;

a timing generator having output connections providing respective domain clock signals, wherein a domain clock signal of a domain providing a data signal is applied to the clock input connection of the first latch of a respective cascade connected set of latches and a domain clock signal of a domain receiving said data signal is applied to the second latch of a respective cascade connected set of latches;

said timing generator providing a common Enable Signal phase locked to said domain clock signals, said common Enable Signal being applied to the enable input connection of said other of said first and second latches of each set of cascade connected latches.

2. The interface apparatus set forth in claim 1 wherein respective clocked and Enabled Data Latches comprise:

a clocked Data Latch having input, output and clock connections;

a multiplexor having an output coupled to the input connection of said clocked Data Latch; a first input connection connected to the output connection of said clocked Data Latch, a second input connection for receiving data signal and a control input connected to said Enable Signal; and wherein the output connection of the clocked Data Latch provides the output signal of the clocked and Enabled Data Latch, and the second input connection of the multiplexor is the input connection of the clocked and Enabled Data Latch.

3. The interface apparatus set forth in claim 1 arranged for interfacing data from a 27 MHz clock domain to a 36 MHz clock domain wherein in said first latch in said cascade connection is a clocked and Enabled Data Latch having its clock input connection connected to a 27 MHz clock signal, and said second latch of said cascade connection is a clocked Data Latch having its clock input connection connected to a 36 MHz clock signal.

4. The interface apparatus set forth in claim 1 arranged for interfacing data from a 27 MHz clock domain to a 18 MHz clock domain wherein in said first latch in said cascade connection is a clocked and Enabled Data Latch having its clock input connection connected to a 27 MHz clock signal, and said second latch of said cascade connection is a clocked Data Latch having its clock input connection connected to a 18 MHz clock signal.

5. The interface apparatus set forth in claim 1 arranged for interfacing data from a 18 MHz clock domain to a 27 MHz clock domain wherein in said first latch in said cascade connection is a clocked Data Latch having its clock input connection connected to a 18 MHz clock signal, and said second latch of said cascade connection is a clocked and Enabled Data Latch having its clock input connection connected to a 27 MHz clock signal.

6. The interface apparatus set forth in claim 1 arranged for interfacing data from a 36 MHz clock domain to a 27 MHz clock domain wherein in said first latch in said cascade connection is a clocked Data Latch having its clock input connection connected to a 36 MHz clock signal, and said second latch of said cascade connection is a clocked and Enabled Data Latch having its clock input connection connected to a 27 MHz clock signal.

7. The interface apparatus set forth in claim 6 further including interface apparatus arranged for interfacing data from a 27 MHz clock domain to a 36 MHz clock domain wherein in said first latch in said cascade connection is a clocked and Enabled Data Latch having its clock input connection connected to a 27 MHz clock signal, and said second latch of said cascade connection is clocked Data Latch having its clock input connection connected to a 36 MHz clock signal.

8. The interface apparatus set forth in claim 4 further including a further interface apparatus having third and fourth cascade connected latches arranged for interfacing data from a 27 MHz clock domain to a 36 MHz clock domain wherein in said third latch in said cascade connection is a clocked and Enabled Data Latch having its clock input connection connected to a 27 MHz clock signal, and said fourth latch of said cascade connection is a clocked Data Latch having its clock input connection connected to a 36 MHz clock signal.

* * * * *